US006656234B2

United States Patent
Dexter et al.

(10) Patent No.: US 6,656,234 B2
(45) Date of Patent: Dec. 2, 2003

(54) TUNING BATTERY ELECTRODE POROSITY TECHNICAL FIELD

(75) Inventors: Derek Richard Dexter, Clinton Township, MI (US); Ronald David Brost, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 09/963,255

(22) Filed: Sep. 26, 2001

(65) Prior Publication Data

US 2003/0091898 A1 May 15, 2003

(51) Int. Cl.[7] .............................................. H01M 4/04
(52) U.S. Cl. ...................... 29/623.5; 429/204; 429/209; 429/228; 141/1.1
(58) Field of Search ........................... 141/1.1; 429/209, 429/204, 228; 29/623.5

(56) References Cited

U.S. PATENT DOCUMENTS 5,302,476 A * 4/1994 Kao et al. .................... 429/228
5,776,209 A * 7/1998 Fauteux et al. ............ 29/623.5

* cited by examiner

Primary Examiner—John S. Maples
(74) Attorney, Agent, or Firm—Artz & Artz

(57) ABSTRACT

A method is provided for manufacturing a battery 18 having battery electrodes 20 and 22 with a desired porosity, using an electrochemical model 42 and a thermal model 44, that includes determining energy and current requirements for a particular application. Characteristics of the battery 18 in response to said energy and current requirements are determined. The battery characteristics and energy and current requirements are prepared for use in the electrochemical model 42 and the thermal model 44. The porosity of the battery electrodes is determined by solving equations within the electrochemical model 42 and the thermal model 44. Porosity of the battery electrodes is varied until voltage potential across the battery varies by less then a predetermined tolerance factor for an operating range state of charge. A paste mixture is created in response to the desired battery electrode porosity. The paste mixture is applied to a grid followed by curing of the grid and paste.

21 Claims, 7 Drawing Sheets

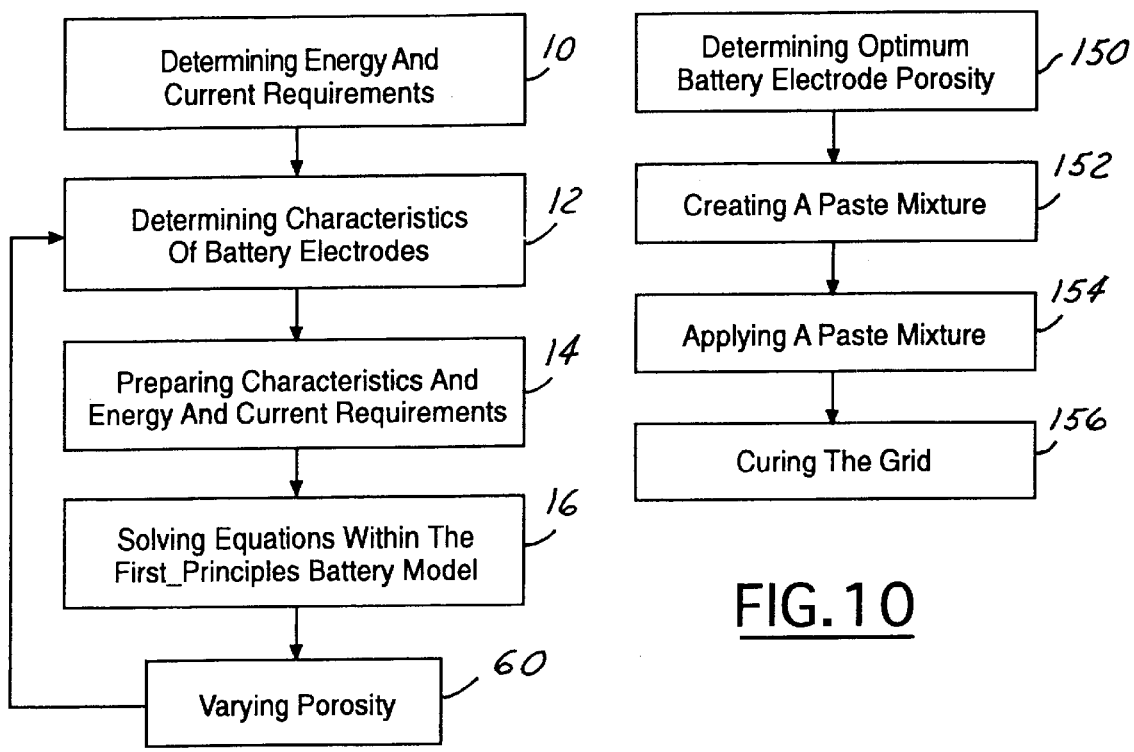
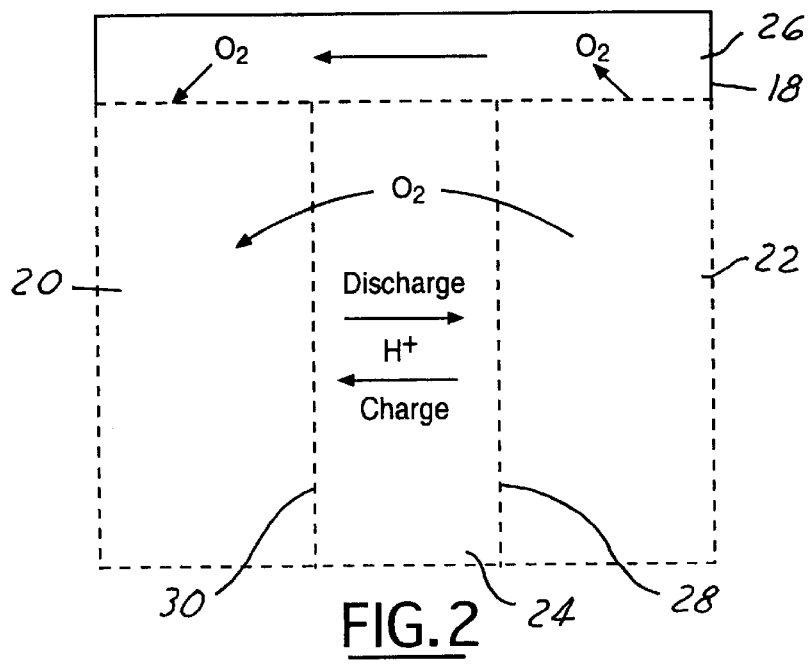

TUNING BATTERY ELECTRODE POROSITY

TECHNICAL FIELD

The present invention relates generally to electrodes for electrochemical batteries, and more particularly to a method for creating a desirable battery electrode porosity for a given set of battery characteristics and application parameters.

BACKGROUND OF THE INVENTION

Electrochemical batteries are used in a variety of applications. Electrochemical batteries convert chemically stored energy into electrical energy. Electrochemical batteries contain an anode, a cathode, and an electrolyte. The anode and the cathode may be produced from the following materials: lead, copper, steel, titanium, nickel, ceramic, polymers, or other various materials known in the art. The electrolyte may be composed of water, an organic compound, a gel or a conductive solid. The electrolyte may also contain a salt or an acid. An electrical potential exists between the anode and the cathode that creates an electrical current through the electrolyte from the cathode to the anode.

Electrochemical batteries have become the main power sources in many applications such as electric vehicles. Many electric vehicles use valve-regulated lead-acid (VRLA) batteries. Limitations in the use of VRLA batteries relate to issues of imposed electrolyte concentration gradients. Imposed electrolyte concentration gradients cause lower electrochemical battery discharge performance. The chemistry of VRLA batteries is particularly susceptible to a deficit of electrolyte at low states of charge, which can cause the battery voltage and energy output to drop precipitously.

The concentration of electrolyte at an electrode active site is a major contributor in a battery polarization function, particularly at low states of charge. As the electrolyte is consumed, the progressively lower concentration leads to more pronounced concentration polarizations. It has been further discovered that diffusion of the electrolyte through the electrode itself may become a limiting process if current densities of the electrolyte are sufficiently high.

Various solutions have provided methods for monitoring certain operating characteristics such as state-of-charge, temperature, and terminal voltage of an electrochemical battery. In so monitoring various characteristics, rating values of a particular electrochemical battery have been quantified such as discharge rate, capacity, and cycle life. In evaluation of the various operating characteristics in correlation to the resulting rating values, improvements to electrochemical batteries have been proposed. The proposed improvements include adjusting or changing the type, size, and quantity of the materials used, but these proposed improvements have not been sufficient in optimizing electrolyte diffusion.

Therefore, a need exists to optimize diffusion of the electrolyte thereby increasing the capacity, the discharge performance, and the cycle life of electrochemical batteries.

Moreover, it is desirable to optimize the diffusion of the electrolyte for various applications having different requirement needs.

SUMMARY OF THE INVENTION

Accordingly, the present invention provides an improved manufacturing method for increasing the performance of a battery. An advantage of the present invention is that it provides a method of optimizing the diffusion of an electrolyte within a battery for various applications.

The foregoing and other advantages are provided by a method of determining the optimum porosity for a set of battery electrodes for a given application and a method of manufacturing the battery electrodes having the determined optimum porosity.

A method is provided for calculating desired porosity of battery electrodes of a battery during the manufacturing of the battery electrodes using an electrochemical model and a thermal model of the battery including determining energy and current requirements for a particular application. Characteristics of the battery in response to said energy and current requirements are determined. The battery characteristics and energy and current requirements are prepared for use in the electrochemical model and the thermal model. Porosity of the battery electrodes is determined by solving equations within the electrochemical model and the thermal model. Porosity of the battery electrodes are varied until voltage potential across the battery varies by less then a predetermined tolerance factor for an operating range state of charge.

A method of manufacturing battery electrodes for a battery is also provided, which includes determining desired battery electrode porosity for a particular application. A paste mixture is created in response to the desired battery electrode porosity. The paste mixture is applied to a grid followed by curing of the grid and paste.

One of several advantages of the present invention is that it determines the optimum porosity for a given set of battery electrodes of a particular electrochemical battery at which diffusion no longer substantially limits battery performance.

Another advantage of the invention is that it provides a technique for fabricating battery electrodes having optimum porosity.

Another advantage of the present invention is that it provides a method of determining the optimum battery electrode porosity without physically building the battery electrodes. This reduces time and costs in building and testing of the battery.

Therefore, the present invention by providing a manufacturing method for a battery having battery electrodes with optimum porosity, also provides a technique for constructing a battery for a particular application that has increased capacity, performance, and cycle life.

The present invention itself, together with further objects and attendant advantages, will be best understood by reference to the following detailed description, taken in conjunction with the accompanying drawing.

BRIEF DESCRIPTION OF THE DRAWING

For a more complete understanding of this invention reference should now be had to the embodiment(s) illustrated in greater detail in the accompanying figures and described below by way of examples of the invention wherein:

FIG. 1 is a flow chart illustrating a method of manufacturing battery electrodes of a battery according to an embodiment of the present invention;

FIG. 2 is a schematic illustrating electrochemical discharge and oxygen cycle of a battery in accordance with an embodiment of the present invention;

FIG. 10 is a flow chart illustrating a method of optimizing porosity of battery electrodes during manufacturing of the battery electrodes using a first-principles battery model in accordance with an embodiment of the present invention.

LIST OF SYMBOLS

Figure 3:
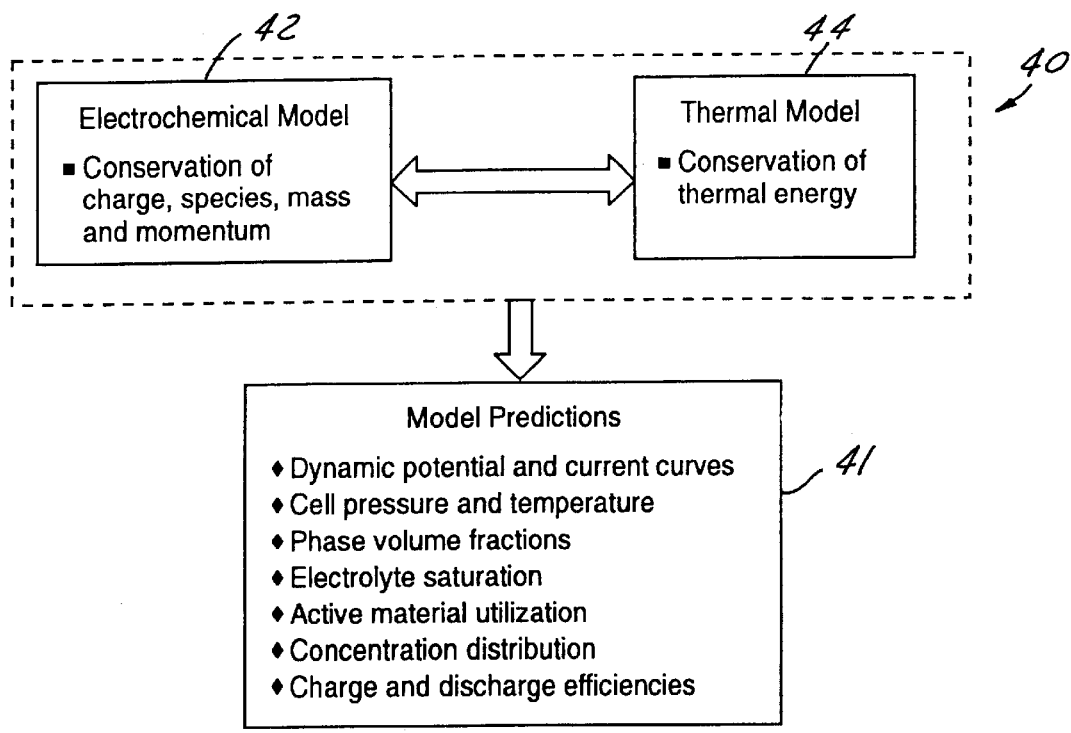
FIG. 3 is a flow chart summarizing a first-principles battery model formulation and its predictabilities according to the present invention.

| | |
|---|---|
| a | specific surface area active for electrode reaction, $cm^2/cm^3$ |
| $c^i$ | concentration of species i in a phase, $mol/cm^3$ |
| $c_p$ | specific heat, $J/kg \cdot K$ |
| $d_s$ | particle diameter, cm |
| $D^i$ | diffusion coefficient of species i, $cm^2/s$ |
| EUC | electrode utilization coefficient defined as the ratio of discharged to the maximum charge capacity |
| F | Faraday's constant, 96,487 C/mol |
| h | heat transfer coefficient, $W/cm^2 K$ |
| H' | Henry constant |
| I | applied current density, $A/cm^2$ |
| $i_{nj}$ | transfer current density of reaction j, $A/cm^2$ |
| $i_{oj,ref}$ | exchange current density of reaction j at a reference state, $A/cm^2$ |
| $J_{eg}^{O_2}$ | evaporation rate of oxygen at the gas/electrolyte interface, $mol/cm^3 s$ |
| K | absolute permeability of a porous medium, $cm^2$ |
| k | interfacial mass transfer coefficient at the gas/electrolyte interface, cm/s |
| $k_{re}$ | relative permeability of the electrolyte phase in porous electrode or separator |
| l | diffusion length |
| M | molecular weight, kg/kmol |
| p | pressure, bar |
| $P_c$ | valve closing pressure |
| $P_o$ | valve opening pressure |
| q | volumetric heat generation rate, $J/cm^3 s$ |
| Q | volumetric heat removal rate from the cell, $J/cm^3 s$ |
| R | universal gas constant, $8.3143 J/mol \cdot K$ |
| s | electrolyte saturation |
| S | source term |
| T | cell temperature, K |
| t | time, s |
| $t_+^o$ | transference number of hydrogen ions with respect to the solvent velocity |
| $U_j$ | open-circuit potential of electrode reaction j, V |
| V | applied voltage, V |
| $V_c$ | cell volume, $cm^3$ |
| $V_g$ | gas volume, $cm^3$ |
| $V_e$ | partial molar volume of $H_2SO_4$ |
| $V_o$ | partial molar volume of $H_2O$ |
| $v_e$ | electrolyte velocity vector, cm/s |

Greek symbols

| | |
|---|---|
| α | transfer coefficient |
| ε | volume fraction of a phase, porosity of a porous medium |
| $\eta_j$ | surface overpotential of electrode reaction j, V |
| κ | ionic conductivity of electrolyte, S/cm |
| $\kappa_D$ | diffusional conductivity, A/cm |

-continued

LIST OF SYMBOLS

| | |
|---|---|
| ρ | density, $g/cm^3$ |
| σ | conductivity of solid active material, S/cm |
| μ | electrolyte viscosity, $kg/cm \cdot s$ |
| φ | potential in a phase, V |
| γ, δ | reaction-specific constant in kinetic rate equations in Table I |

Subscripts

| | |
|---|---|
| c | capillary |
| e | electrolyte phase |
| eff | effective |
| eg | electrolyte-gas interface |
| g | gas phase |
| s | solid phase |
| se | solid/electrolyte interface |
| sep | separator |
| o | initial value |

Superscripts

| | |
|---|---|
| avg | average |
| eff | effective |
| H | proton |
| $O_2$ | oxygen |

DETAILED DESCRIPTION OF THE PREFERRED EMBODIMENT

The present invention may be applied in various applications such as electric vehicles and hybrid electric vehicles, or other vehicle and non-vehicle applications in which electrolyte diffusion efficiency is an important parameter.

The limiting rate of diffusion beyond which electrolyte cannot be supplied quickly enough to maintain a electrochemical reaction within a battery has been determined to be directly related to the density, the discharge pattern, the diffusion, and the porosity of the battery electrodes.

As the porosity of the battery electrodes increase, usually the thickness and the current capability of the battery electrodes also increases. When the thickness of the battery electrodes increases the density of the electrodes may change. The higher the density of the electrodes the higher the capacity of the electrochemical battery. On the other hand, for a particular set of battery characteristics and environmental parameters the higher the current capability the greater the potential is for lower voltage availability. A predetermined voltage potential range is needed for the proper operation of electrical vehicle systems. Furthermore, when the porosity of the battery electrodes is too high, thereby compromising the mechanical integrity of the electrodes, the battery cycle life is limited.

The present invention solves the limitation problems associated with the porosity of the battery electrodes, thereby optimizing the porosity of the battery electrodes for a particular application. In this application the word optimize and optimum refer to a highly desirable configuration within the design constraints and practical limitations, these words do not refer to a perfect model in an ideal sense.

In the following description, various operating parameters and components are described for one constructed embodiment. These specific parameters and components are included as examples and are not meant to be limiting.

Now referring to FIG. 1, a flow chart illustrating a method of manufacturing battery electrodes for a battery according to an embodiment of the present invention is shown.

In step 10, the energy and current requirements are determined for a battery for a particular application. The energy and current requirements vary depending on loading, charge rate, duration of use, and other application driven requirements.

In step 12, the characteristics of the battery including; the number of battery electrodes, the size of each battery electrode, and the optimum porosity of each battery electrode is determined in response to the energy and current requirements. The materials that form the battery are also determined. The materials vary from application to application based on factors such as, capacity, duty cycle, charge time, safety considerations, environmental considerations, and various other constraints or requirements for a particular application.

In step 14, all of the characteristics of the materials used along with the particular application requirements stated above are prepared for use in a first-principles battery model.

Characteristics of the battery are gathered including: size, shape, resistance, thickness, porosities, reaction areas, morphology of electrodes, internal battery pressures, saturation levels, and other related characteristics. Kinetics data of the materials used are collected as known in the art. Control data is collected including thermal effect, reaction times, discharge rates, transfer coefficients, initial state-of-charge, simulation time, and battery resistance. Volume functions of electrolyte, electrode capacity density, active material weights, cell capacity, minimum acid concentration, capacity that has been discharged, initial volume fractions of electrolyte, initial electrode utilization, initial acid concentration, applied current density, power density, and voltage to a single cell are calculated as known in the art. In determining the porosity of battery electrodes the present invention divides an area on one or more battery electrodes to form a grid. The resolution of the grid is adjusted for a particular application. The resolution of the grid is asymptotically related to the increased porosity of the electrodes. In other words, for a given application, an increase in porosity for a given increase in grid resolution above an application specific threshold is minimal.

In step 16, the first-principles battery model, consisting of several mathematical equations, are solved simultaneously. Each equation corresponds to physical theories that describe the inner workings of a battery. The equations are first-principle equations know in the art.

The following describes the theory behind the battery model as well as techniques used in the manufacturing methods of the present invention. Physical phenomena important to battery overcharge process, such as gas generation, transport, and recombination, electrolyte displacement and capillary flow, and venting during discharge/rest/charge, are incorporated in the model. The effects of important parameters, including electrolyte saturation level, interfacial mass transfer coefficient of oxygen, and electrode morphology factor, are described.

Now referring to FIG. 2, a schematic illustrating electrochemical discharge and oxygen cycle of a battery 18 in accordance with an embodiment of the present invention is shown. The battery 18 consists of a cathode 20 containing Pb/PbSO$_4$, a anode 22 containing PbO$_2$/PbSO$_4$, an absorptive glass mat separator 24 with electrolyte H$_2$SO$_4$ absorbed in the separator 24, and a head space 26 to store evolved gas. Electrochemical reactions taking place at each electrode during charge and discharge are given as follows:

Anode 22

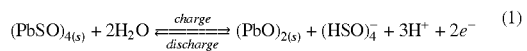

with oxygen evolution

and hydrogen recombination

Cathode 20

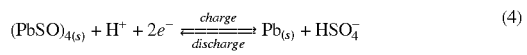

with oxygen recombination

and hydrogen evolution

Overall Internal Battery Reaction

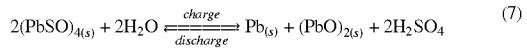

The electrochemical reactions represented by Eqs. (2), (3), (5) and (6) constitute the internal oxygen and hydrogen cycles in the battery 18. During charging and overcharging, oxygen is generated at the interface 28 between the anode 22 and the separator 24 and may evolve into the gas phase after exceeding its solubility limit in the electrolyte H$_2$SO$_4$. The oxygen can then be transported, via the liquid and gas phases, from the anode 22 to the cathode 20 where the oxygen gas may dissolve back in the electrolyte H$_2$SO$_4$ and be reduced at the interface 30 between the cathode 20 and the separator 24. Hydrogen is generated following Eq. (3) at the cathode 20 when the electrode 20 potential goes too low. Hydrogen recombination occurring at the anode as described by Eq. (6) is negligible because of its poor kinetics and depolarization by oxygen. Accumulation of oxygen and hydrogen in the gas phase contributes to the cell pressure build-up, thereby causing venting. Although, the anode contains PbO$_2$/PbSO$_4$, the cathode contains Pb/PbSO$_4$, and the separator contains H$_2$SO$_4$ other materials may be used such as sulfono-lignin, barium sulfate, plastic fibers, sulfuric acid, lead monoxide, water, carbon black, sodium sulfate, graphite, glass fibers, polymer fibers, titanium sub-oxide, dispersant, red lead, and other materials that are used in the art for manufacturing a battery.

Now referring to FIG. 3, a flow chart summarizing the first-principles battery model formulation 40 and its predictabilities 41 are shown. The battery model 40 couples an electrochemical model 42 and a thermal model 44 via heat generation rate and temperature-dependent physico-chemical properties. A derivation of a momentum equation that describes capillary flow of electrolyte is detailed below. The derivation of the momentum equation for capillary flow using conservation of mass over the liquid phase yields:

$$\frac{\partial \varepsilon_e}{\partial t} + \nabla \cdot v_e = S_e^V \qquad (A\text{-}1)$$

where the term $S_e^V$ represents electrolyte displacement during battery 18 operation resulting from the change in partial molar volumes between the reactants and products. The battery electrodes 20 and 22 and the separator 24 have porous surfaces, therefore the electrodes 20 and 22 and the separator 24 create porous medium for electrolyte transfer between them. The flow of electrolyte in porous media is usually described by Darcy's law:

$$v_e = \frac{K k_{re}}{\mu} \nabla p_e \qquad (A\text{-}2)$$

where $p_e$ is the pressure in the electrolyte, K the absolute permeability of the porous medium like electrode and separator, $k_{re}$ represents relative permeability of electrolyte phase, and $\mu$ represents dynamic viscosity of the electrolyte. Since the electrolyte pressure differs from the gas pressure by a capillary pressure namely, $$p_e = p_g - p_c \qquad (A\text{-}3)$$

Equation (A-2) can be rewritten as $$v_e = \frac{K k_{re}}{\mu} \nabla p_c - \frac{K k_{re}}{\mu} \nabla p_g \qquad (A\text{-}4)$$

Equation (A-4) describes electrolyte flow driven by capillary forces minus electrolyte displacement by a gradient in the gas pressure. The capillary forces are dominant when the thickness of an unsaturated cell is small and as a result, the gas phase pressure is nearly uniform. Neglecting the gradient in gas phase pressure, one has $$v_e = \frac{K k_{re}}{\mu} \nabla p_c \qquad (A\text{-}5)$$

The porous medium, has absolute permeability, which is evaluated by Kozeny-Carman relation:

$$K = \frac{\varepsilon^3}{5 a_{se}^2} = \frac{\varepsilon^3 d_s^2}{180(1-\varepsilon)^2} \qquad (A\text{-}6)$$

where $\varepsilon$ is the porosity of the porous medium and $d_s$ is the diameter of spherical particles that form the medium.

The relative permeability of the electrolyte phase is a function of electrolyte saturation $$k_{re} = s^n \qquad (A\text{-}7)$$

where the index n is an empirical value varying between 1 and 3.

The two-phase capillary pressure can be expressed in terms of a Leverett function J(s), namely $$p_c = \sigma \left(\frac{\varepsilon}{K}\right)^{\frac{1}{2}} J(s) \qquad (A\text{-}8)$$

Making use of Eqs. (A-6) through (A-8), and the definition of electrolyte saturation Eq. (8), Equation (A-5) becomes $$v_e = -D_c \nabla s - D_{\varepsilon/K} \nabla \left(\frac{\varepsilon}{K}\right)^{\frac{1}{2}} \qquad (A\text{-}9)$$

where $$D_c = -\sigma \left(\frac{\varepsilon}{K}\right)^{\frac{1}{2}} J'(s) \frac{K k_{re}}{\mu} \qquad (A\text{-}10)$$

and $$D_{\varepsilon/k} = -\sigma J(s) \frac{K k_{re}}{\mu} \qquad (A\text{-}11)$$

$D_c$ represents capillary diffusion coefficient and has a unit of cm$^2$/s. Substituting Eq. (A-9) into Eq. (A-1), one has $$\varepsilon \frac{\partial s}{\partial t} = \nabla \cdot D_c \nabla s + \nabla \cdot D_{\varepsilon/k} \nabla \left(\frac{\varepsilon}{K}\right)^{\frac{1}{2}} + (S_e^V + s S_s^V) \qquad (A\text{-}12)$$

The detailed derivation of other governing equations is similar to that for a Ni-MH battery and thus will not be repeated here. The final model equations are summarized in Table I, along with source terms and effective transport properties appearing in the conservation equations as listed in Tables II and III, respectively.

TABLE I

Summary of Governing Equations

| Kinetic Rate Equations | Primary reactions (j = 1 and 4) |
|---|---|
| $(\eta_j = \phi_s - \phi_e - U_j)$ | $i_{nj} = i_{oj,ref} \left(\frac{c^H}{c_{ref}^H}\right)^\gamma \left[\exp\left(\frac{\alpha_{aj}F}{RT}\eta_j\right) - \exp\left(-\frac{\alpha_{cj}F}{RT}\eta_j\right)\right]$ |
| | Oxygen generation and recombination (j = 2 and 5) |
| | $i_{nj} = i_{oj,ref} \left(\frac{c^H}{c_{ref}^H}\right)^{\gamma_{O_2}} \left[\exp\left(\frac{\alpha_{aj}F}{RT}\eta_j\right) - \left(\frac{c_e^{O_2}}{c_{e,ref}^{O_2}}\right)^{\delta_{O_2}} \exp\left(-\frac{\alpha_{cj}F}{RT}\eta_j\right)\right]$ |
| | Hydrogen evolution (j = 6) |

TABLE I-continued

Summary of Governing Equations $$i_{nj} = -i_{oj,ref}\left(\frac{c^H}{c_{ref}^H}\right)^{\gamma H2} \exp\left(-\frac{\alpha_{cj}F}{RT}\eta_j\right)$$

Conservation of charge  In electrolyte $$\nabla \cdot (\kappa^{eff}\nabla\phi_e) + \nabla \cdot [\kappa_D^{eff}\nabla(\ln c^H)] + S_e^c = 0$$

In solid electrode $$\nabla \cdot (\sigma^{eff}\nabla\phi_s) - S_e^c = 0$$

Conservation of species  In electrolyte $$\frac{\partial(\varepsilon_e c^H)}{\partial t} + \nabla \cdot (v_e c^H) = \nabla \cdot (D_{eff}^H \nabla c^H) + S^H$$

$$\frac{\partial(\varepsilon_e c_e^{O2})}{\partial t} + \nabla \cdot (v_e c_e^{O2}) = \nabla \cdot (D_{e,eff}^{O2} \nabla c_e^{O2}) + S_e^{O2}$$

In gas phase $$\frac{\partial(\varepsilon_e c_e^{O2})}{\partial t} = \nabla \cdot (D_{g,eff}^{O2} \nabla c_g^{O2}) + J_{eg}^{O2}$$

Conservation of mass  In electrolyte $$\frac{\partial \varepsilon_e}{\partial t} + \nabla \cdot v_e = S_e^V$$

In solid electrode $$\frac{\partial \varepsilon_s}{\partial t} = S_s^V$$

Conservation of momentum $$v_e = -D_c \nabla s - D_{\varepsilon/K} \nabla \left(\frac{\varepsilon}{K}\right)^{\frac{1}{2}}$$

or $$\varepsilon\frac{\partial s}{\partial t} = \nabla \cdot D_c \nabla s + \nabla \cdot D_{\varepsilon/K} \nabla \left(\frac{\varepsilon}{K}\right)^{\frac{1}{2}} + (S_e^V + sS_s^V)$$

Conservation of thermal energy $$\frac{d(\rho c_p T)}{dt} = q - Q$$

TABLE II

Source terms in conservation equations

| | Anode | Separator | Cathode |
|---|---|---|---|
| $S_e^c$ | $a_1 i_{n1} + a_2 i_{n2}$ | 0 | $a_4 i_{n4} + a_5 i_{n5} + a_6 i_{n6}$ |
| $S^H$ | $\frac{3-2t_+^0}{2F}a_1 i_{n1} + \frac{1-t_+^0}{F}a_2 i_{n2}$ | 0 | $\frac{1-2t_+^0}{2F}a_4 i_{n4} + \frac{1-t_+^0}{F}(a_5 i_{n5} + a_6 i_{n6})$ |
| $S_e^{O2}$ | $\frac{1}{4F}a_2 i_{n2} - J_{eg}^{O2}$ | $-J_{eg}^{O2}$ | $\frac{1}{4F}a_5 i_{n5} - J_{eg}^{O2}$ |
| $J_{eg}^{O2}$ | | | $k(c_e^{O2} - H'c_g^{O2}), k = a_{eg}\frac{D_e^{O2}}{l_{eg}}$ |
| $S_e^V$ | $[\hat{V}_e(3-2t_+^0) - 2\hat{V}_o]\frac{a_1 i_{n1}}{2F} + [\hat{V}_e(2-2t_+^0) - \hat{V}_o]\frac{a_2 i_{n2}}{2F}$ | 0 | $\hat{V}_e(1-2t_+^0)\frac{a_4 i_{n4}}{2F} + [\hat{V}_e(2-2t_+^0) - \hat{V}_o]\frac{a_5 i_{n5}}{2F} + \hat{V}_e(2-2t_+^0)\frac{a_6 i_{n6}}{2F}$ |

TABLE II-continued

Source terms in conservation equations

| | Anode | Separator | Cathode |
|---|---|---|---|
| $S_s^V$ | $\left(\dfrac{M_{PbO_2}}{\rho_{PbO_2}} - \dfrac{M_{PbSO_4}}{\rho_{PbSO_4}}\right)\dfrac{a_1 i_{n1}}{2F}$ | 0 | $\left(\dfrac{M_{PbSO_4}}{\rho_{PbSO_4}} - \dfrac{M_{Pb}}{\rho_{Pb}}\right)\dfrac{a_4 i_{n4}}{2F}$ |
| q | $\dfrac{1}{V_c}\int_{V_c} a_j \sum_j \left(\eta_j + T\dfrac{\partial U_j}{\partial T}\right) dV + \dfrac{1}{V_c}\int_{V_c}[\kappa^{\text{eff}}\nabla\phi_e \cdot \nabla\phi_e + \sigma^{\text{eff}}\nabla\phi_s \cdot \nabla\phi_s]dV$ | | |

TABLE III

Effective transport properties in conservation equations

| Symbol | Expression | Reference |
|---|---|---|
| $\kappa_{\text{eff}}$ | $\varepsilon_e^{1.5}\kappa$ | Bruggeman relation |
| $\kappa_D^{\text{eff}}$ | $\dfrac{RT\kappa^{\text{eff}}}{F}(2t_+^0 - 1)$ | [6] |
| $\sigma^{\text{eff}}$ | $\varepsilon_s^{1.5}\sigma$ | Bruggeman relation |
| $D_{\text{eff}}^H$ | $\varepsilon_e^{1.5} D^H$ | Bruggeman relation |
| $D_{e,\text{eff}}^{O_2}$ | $\varepsilon_e^{1.5} D_e^{O_2}$ | Bruggeman relation |
| $D_{g,\text{eff}}^{O_2}$ | $f(s) D_g^{O_2}$ | empirical correlation |
| $D_c$ | $-\sigma\left(\dfrac{\varepsilon}{K}\right)^{\frac{1}{2}} J'(s)\dfrac{Kk_{re}}{\mu}$ | Eq. (A-10) |
| $D_{\varepsilon/K}$ | $-\sigma J(s)\dfrac{Kk_{re}}{\mu}$ | Eq. (A-11) |
| K | $\dfrac{\varepsilon^3 d_s^2}{180(1-\varepsilon)^2}$ | Kozeny-Carman equation |

The electrolyte saturation is defined as $$s = \frac{\varepsilon_e}{\varepsilon} = 1 - \frac{\varepsilon_g}{\varepsilon} \tag{8}$$

where $\varepsilon$ is the porosity of an electrode or separator. $\varepsilon_e$ and $\varepsilon_g$ are the volume fractions of electrolyte and gas phases, respectively. Oxygen transport from the positive to cathode is facilitated by low saturations of electrolyte (i.e. large void volume) in the separator. The effective oxygen gas diffusion coefficient could vary by three orders of magnitude if the saturation level changes from 90% to 70%. The electrolyte saturation, which determines the capillary pressure, is a primary driving force to the capillary flow of the electrolyte.

The interfacial evaporation rate of oxygen from liquid to gas phase is determined by $$J_{eg}^{O_2} = k\left(c_e^{O_2} - H' c_g^{O_2}\right) \tag{9}$$

where k is the interfacial mass transfer coefficient of the dissolved oxygen on the electrolyte side and H' the Henry constant. The difference between the phase-averaged concentration, $c_e^{O_2}$, and the interfacial concentration of dissolved oxygen, $H'c_g^{O_2}$, provides a driving force for interfacial mass transfer from the electrolyte to the gas phase. Using diffusion length, the mass transfer coefficient can further be expressed as $$k = a_{eg}\frac{D_e^{O_2}}{l_{eg}} \tag{10}$$

where $a_{eg}$ is the specific area of the electrolyte/gas interface, $D_e^{O_2}$ is the diffusion coefficient of the dissolved oxygen in the electrolyte, and $l_{eg}$ is a microscopic diffusion length and its value is proportional to electrolyte film thickness. Oxygen recombination at the cathode 20 is limited by the interfacial mass transfer coefficient. A thin film condition in the cathode 20 will facilitate the oxygen transport through the gas/electrolyte interface and hence the oxygen recombination.

A principal geometric parameter for characterizing electrode performance is the specific area active for electrode reaction j, which is, in turn, dependent upon the porosity and particle size as well as the local state of charge namely;

$$a_{sj} = a_{si}(1 - EUC^\xi) \quad \text{for discharge} \tag{11}$$

$$a_{sj} = a_{si} EUC^\xi \quad \text{for charge} \quad i = PbO_2 \text{ or } Pb$$

for primary reactions and $$a_{sj} = a_{si}(1 - EUC^\xi) \quad i = PbO_2 \text{ or } Pb \tag{12}$$

for oxygen and hydrogen reactions. Here $a_s$ denotes the specific area, with subscript i denoting the active materials $PbO_2$ at the anode 22 and Pb at the cathode 20, respectively, and EUC represents the electrode utilization coefficient defined as the ratio of used charge capacity to the maximum charge capacity at fully-charged state. Equations (11) and (12) describe the amount of active area during discharge or charge, and the exponent ξ is a morphology factor describing the rate of change in the specific area.

Figure 4:
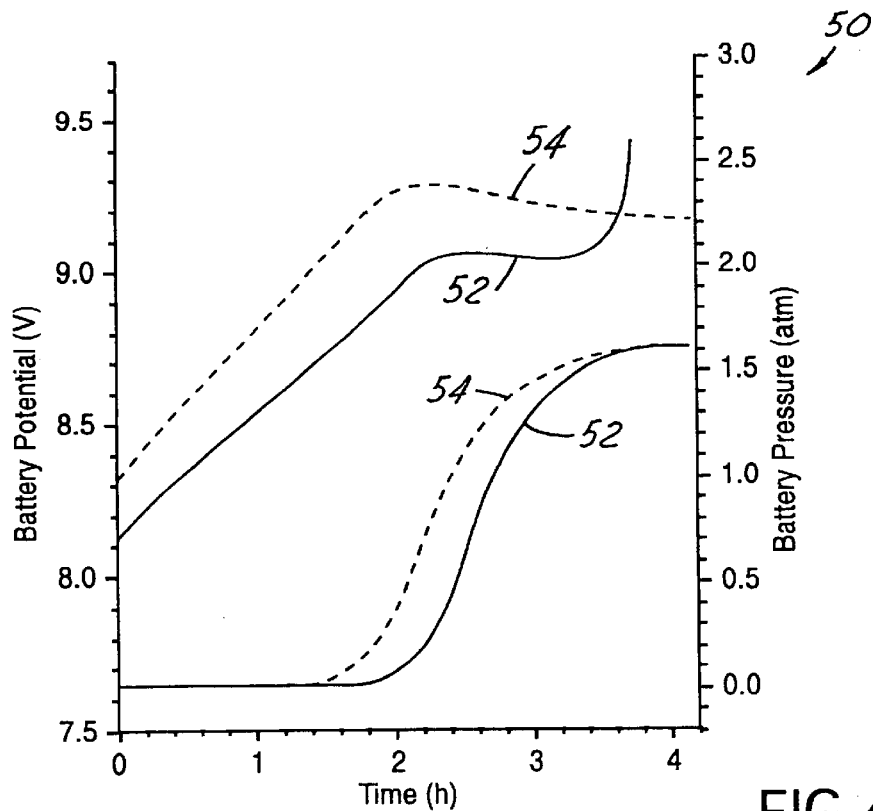
FIG. 4 is a graph of battery potential over time illustrating the effect of morphology factor on battery potential and cell pressure according to the present invention.

Now referring to FIG. 4, a graph 50 illustrating the effect of morphology factor (MF) that accounts for the passivation effect of $PbSO_4$ on a specific electroactive area, as shown by Eqs. (11) and (12) is shown. The graph 50 illustrates battery potential and battery pressure over time for MF equal to 0.6 represented by curve 52 and MF equal to 1.1 represented by curve 54. During charging, a smaller value of MF yields a slower change in the specific area. Consequently, the surface overpotential that drives the electrode reaction is smaller, and the potential of the anode 22 remains comparatively low and thus oxygen evolution takes place later. On the other hand, a larger value of MF yields a higher surface overpotential and the oxygen reactions occur earlier and become dominant. As a result, the battery 18 potential tapers off, as the cathode 20 has not yet achieved a fully charged state.

The average battery pressure can be calculated by summing up partial pressures of all gases present in the gas phase $$p_g^{avg} = \sum_i p^i \quad i = O_2, H_2, \text{ and } N_2 \tag{13}$$

where the nitrogen gas partial pressure is determined from the initial condition and remains unchanged until venting takes place. The oxygen and hydrogen partial pressures are calculated using the ideal gas law $$p^i = c_g^{i,avg} RT \quad i = O_2 \text{ and } H_2 \tag{14}$$

The average oxygen and hydrogen concentrations in the gas phase are evaluated by $$c_g^{i,avg} = \frac{1}{V_c} \int_{V_c} \varepsilon_g c_g^i dV \quad i = O_2 \text{ and } H_2 \tag{15}$$

where $V_c$ is the entire cell volume including that of the head space.

The battery 18 used by an embodiment of the present invention may regulate battery pressure through a venting valve. Whenever the internal gas pressure becomes greater than the valve preset opening pressure, $P_o$, gas is released into the ambient until the internal pressure drops below the valve preset closing pressure, $P_c$. Assuming that the time of gas relief at pressures higher than the opening pressure of the valve is negligible, a single venting event can be simply modeled by the following procedure:

if $p_g^{avg} < P_o$, then $n_g = n_g$ and $p_g^{avg} = p_g^{avg}$ if $p_g^{avg} > P_o$, then $n_g = n_g P_c / p_g^{avg}$ and $p_g^{avg} = P_c$ \tag{16} where $n_g$ is the number of moles in gas. All gas partial pressures and their local concentrations decrease accordingly with venting.

Initial and boundary conditions for the primary reaction are needed to close the battery model. The potentials in the solid and electrolyte phases are governed by Poisson equation without time derivatives; hence, their initial conditions are not necessary. The appropriate boundary conditions for $\phi_s$ and $\phi_e$ are:

$$\phi_s = 0 \text{ or } V \tag{17}$$

on current collectors for a given voltage, or $$-\sigma_{eff} \frac{\partial \phi_s}{\partial n} = I \tag{18}$$

for a prescribed current density. Everywhere else on boundaries of the battery 18, one has $$\frac{\partial \phi_e}{\partial n} = \frac{\partial \phi_s}{\partial n} = 0 \tag{19}$$

Here n is the unit vector normal to the boundary surface. The concentration initial/boundary conditions are given by $$c^i = c_0^i \text{ at } t = 0 \tag{20}$$

$$\frac{\partial c^i}{\partial n} = 0$$

The temperature initial/boundary conditions can be written as, $$T = T_o \quad \text{at } t = 0 \tag{21}$$

$$-\lambda_c \frac{\partial T}{\partial n} = h(T - T_a)$$

where $\lambda_c$ is the thermal conductivity of the case material, and h the overall convective heat coefficient that may include the effects of other heat transfer modes. $T_a$ is the ambient temperature The initial conditions for electrolyte velocity and saturation level is determined by assuming that the system is initially at equilibrium; i.e.

$$v_e = 0 \text{ at } t = 0 \tag{22}$$

and $$D_c \nabla s + D_{\varepsilon/K} \nabla \left(\frac{\varepsilon}{K}\right)^{\frac{1}{2}} = 0 \text{ at } t = 0 \tag{23}$$

That is, there is no electrolyte flow initially. Electrolyte starts to flow after electrode reactions take place, resulting in changes in volume fractions of solid and electrolyte, and thus changes in the electrolyte saturation level, porosity, and permeability.

Equation (23) is used to evaluate the initial electrode permeability given the permeability of separator 24. At interfaces 28 and 30, there are sharp changes of electrolyte saturation and porosity. Equation (23) shows that the velocity induced by a saturation gradient is balanced by the velocity caused by a gradient of $(\varepsilon/K)^{1/2}$ at equilibrium.

To numerically solve the foregoing model equations, the general computational fluid dynamics (CFD) methodology is adopted in the present work. The key to a successful application of CFD techniques is that all the equations in the present battery model can be cast into a general form of convection-diffusion type, i.e., $$\underbrace{\frac{\partial(\varepsilon\Phi)}{\partial t}}_{\text{accumulation}} + \underbrace{\nabla \cdot (v\Phi)}_{\text{convection}} = \underbrace{\nabla \cdot (\Gamma_\Phi \nabla \Phi)}_{\text{diffusion}} + \underbrace{S_\Phi}_{\text{source}} \tag{24}$$

where $\Phi$ is a general variable to be solved, $\Gamma_\Phi$ a diffusion coefficient, and S a source term which includes all terms that cannot be included in the previous terms.

The general differential equation is then discretized by a control volume-based finite difference method and the resulting set of algebraic equations is iteratively solved. The numerical solver for the general differential equation can be repeatedly applied for each scalar variable over a control volume mesh. The solution of each of the components of the electrolyte momentum equation is, however, obtained in a staggered control volume using SIMPLER (Semi-Implicit Method for Pressure-Linked Equations Revised) algorithm; see S. V. Patankar, Numerical Heat Transfer and Fluid Flow, Hemisphere, Washington D.C., 1980 for details. A rectangular physical domain is divided by either a uniform or a non-uniform grid consisting of m horizontal and n vertical grid lines. Stringent numerical tests are performed to ensure that solutions are independent of the grid size and time step. The equations are solved as a simultaneous set, and convergence is reached when the relative error in each field between two consecutive iterations is less than $10^{-5}$.

In step 60, the porosity of the anode 22, the cathode 20, and the separator 24 of the battery 18 is adjusted until the voltage across the anode 22 and the cathode 20 during discharge varies preferably by less than a pre-determined tolerance factor of:

$$dV/dt<0.10V/min$$

The predetermined tolerance factor may vary depending on the application. The porosity adjustments are compared at various rates of discharge. By increasing the concentration of electrolyte the paste that creates the battery electrodes 20 and 22 the porosity of the electrodes 20 and 22 increases. When the porosity increases the diffusion of the electrolyte increases. The following equation relates porosity to diffusion:

$$D_{eff}=D_{bulk}*A*\theta/\tau$$

Where $D_{eff}$ is the effective diffusion, $D_{bulk}$ is the bulk diffusion, A is the cross-sectional area of a battery electrode, $\theta$ is the porosity, and $\tau$ is tortuosity.

The above-described method allows the optimum porosity to be determined mathematically using known battery model principles with out actually producing the physical battery 18. This method besides increasing the performance of the battery 18 also decreases the costs that would be incurred from trial and error testing and builds of batteries with different porosity battery electrodes.

The above-described method for determining the optimum porosity may be performed electronically using a computer and simulated using an electronic simulation model.

Figure 5:
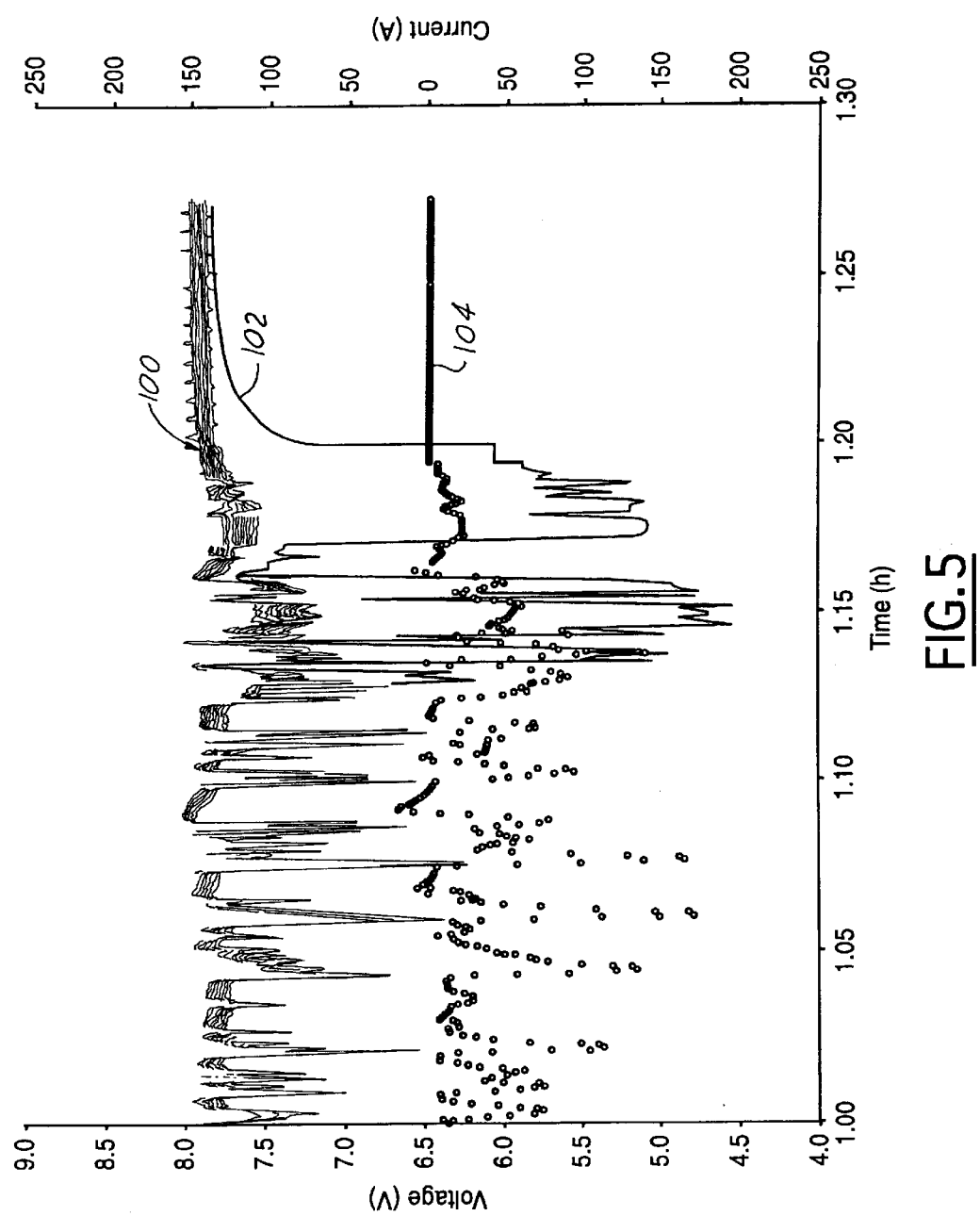
FIG. 5 is a graph illustrating the effect of electrode electrolyte diffusion limitation on module voltage according to the present invention.

Now referring to FIG. 5, a graph of voltage and current versus time for 39 batteries having battery electrodes with different porosity, in series, and powering a vehicle. The set of curves 100 represent change in voltage over time for a battery having battery electrodes with the appropriate porosity for a tested application unlike curve 102 that illustrates when the porosity of battery electrodes are not in the correct operating range for a particular application. Curve 104 illustrates the average current throughout the event passing through all 39 batteries.

Figure 6:
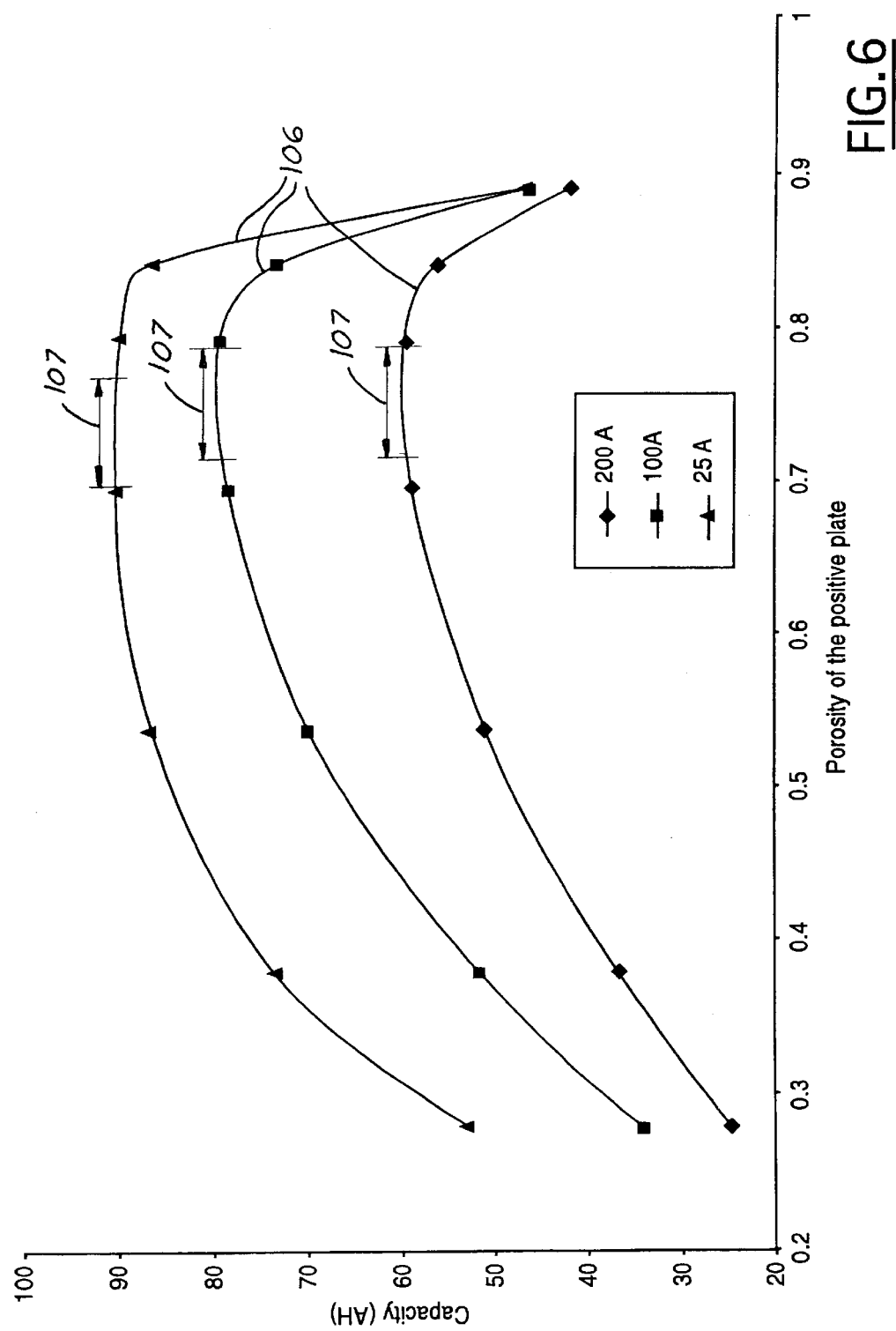
FIG. 6 is a graph of capacity versus porosity of a anode within a battery for various constant discharge rates according to an embodiment of the present invention.

Now referring to FIG. 6, a graph of capacity versus porosity of the anode 22 within the battery 18 for various constant discharge rates in accordance with an embodiment of the present invention is shown. Three different curves 106 are shown for discharge rates of 25A, 100A, and 200A. Each porosity curve 106 has an ideal operating range 107 from approximately 0.68 to 0.78. When the porosity is adjusted above 0.8 the chance of the battery capacity "falling off" greatly increases. Therefore, porosity levels, for the particular application tested, above 0.8 are not desired.

Figure 7:
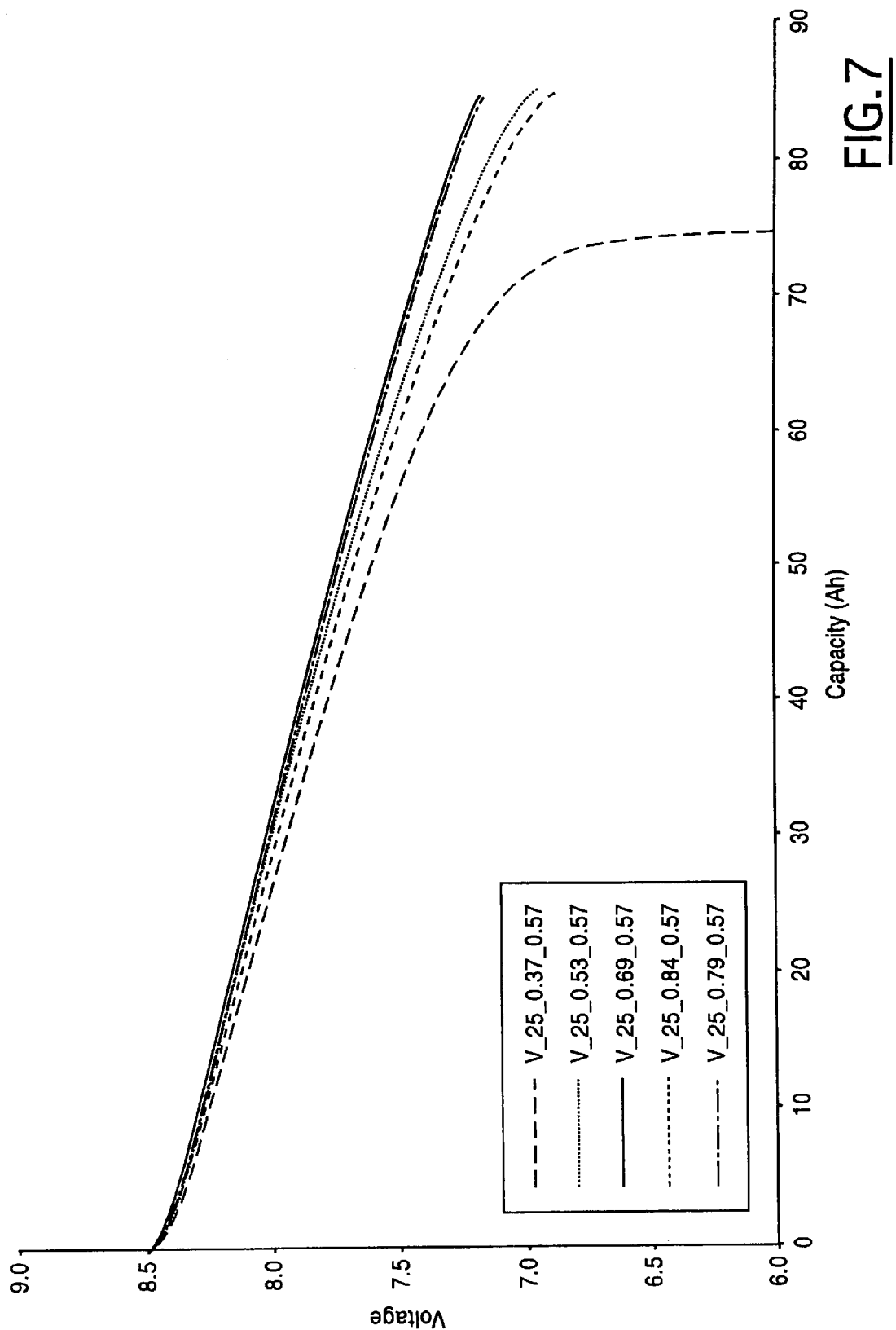
FIG. 7 is a graph of voltage versus capacity, of the battery in FIG. 6, for various anode porosities, during a constant discharge of 25A, and in accordance with an embodiment of the present invention.
Figure 8:
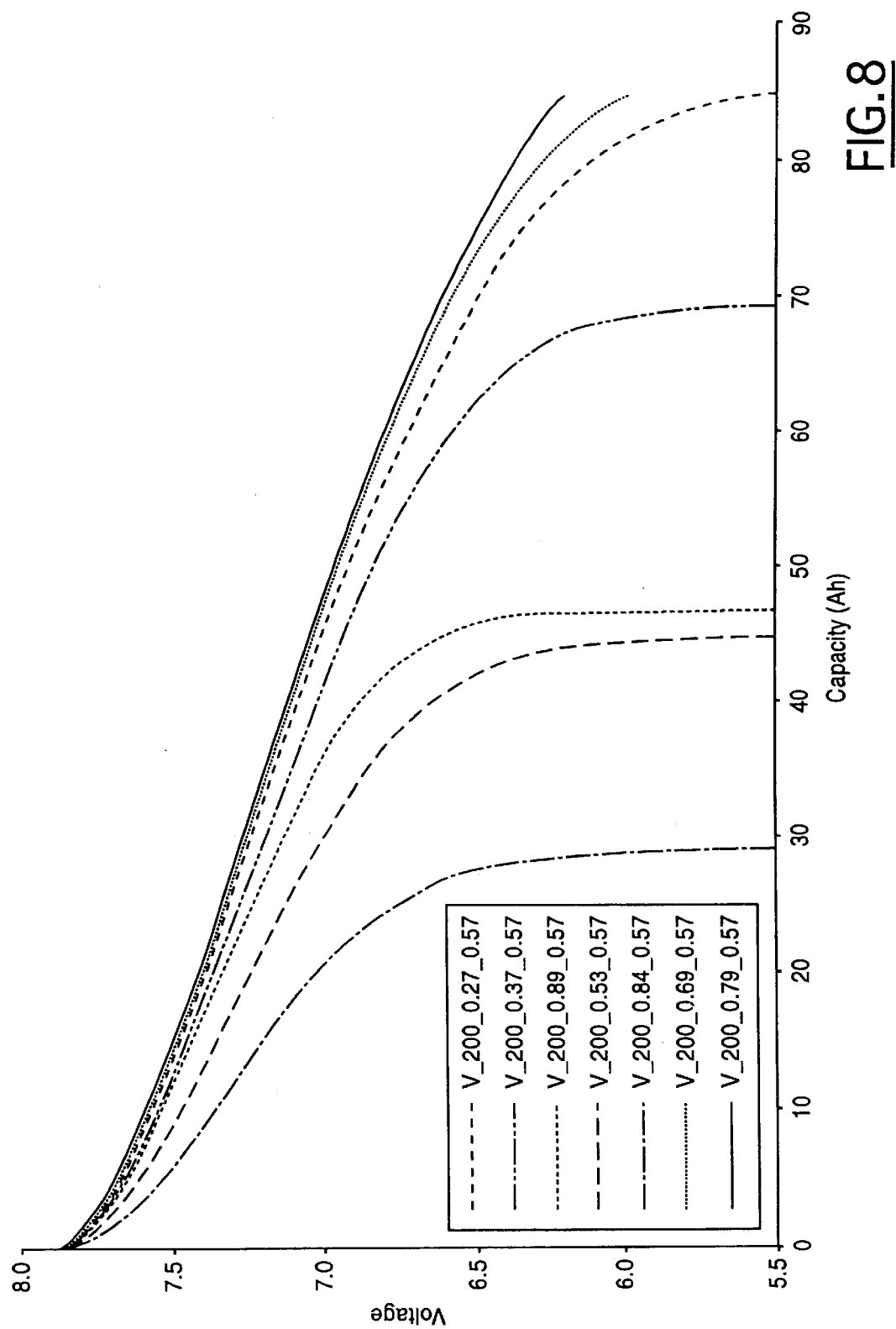
FIG. 8 is a graph of voltage versus capacity, of the battery in FIG. 6, for various anode porosities, during a constant discharge of 200A, and in accordance with an embodiment of the present invention.
Figure 9:
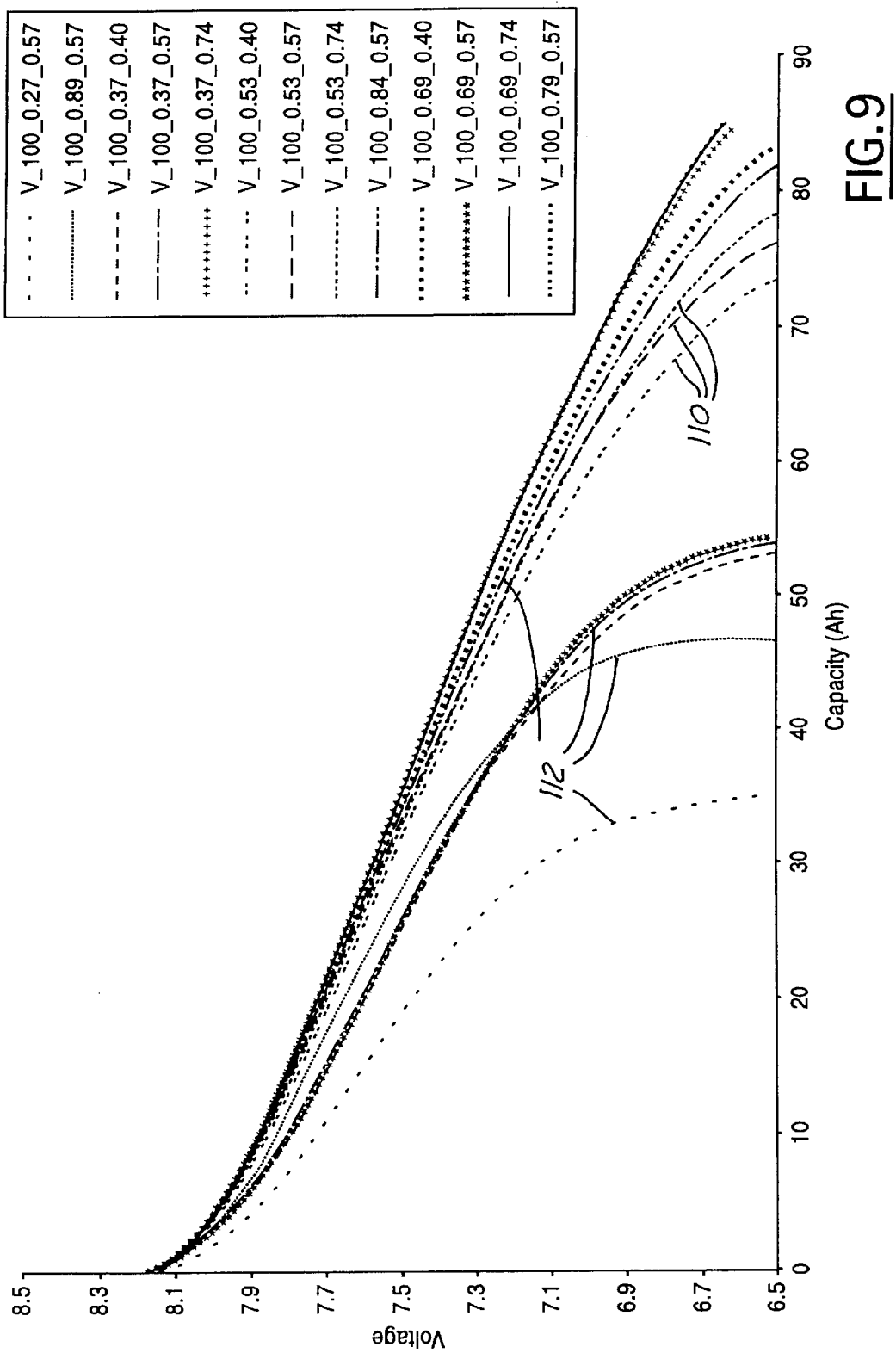
FIG. 9 is a graph of voltage versus capacity, of the battery in FIG. 6, for various anode and cathode porosities, during a constant discharge of 100A, and in accordance with an embodiment of the present invention.

Now referring to FIGS. 7 and 8, graphs of voltage versus capacity (amp hours), of the battery in FIG. 6, during a constant discharge of 25A and 200A respectively are shown. The porosity of just the anode 22 is adjusted while keeping the porosity of the cathode 20 at 0.57. Changing the porosity of the anode 22 provides a greater change in battery performance than does changing the porosity of the cathode 20, which is best illustrated in FIG. 9 below. The higher the porosity of the anode 22 the higher the capacity or amp hours of the battery 18. The adjustment to porosity of the anode 22 has been determined to have a greater effect on the diffusion of the electrolyte over porosity adjustment to the cathode 20.

Now referring to FIG. 9, a graph of voltage versus capacity, of the battery 18 in FIG. 6, for various anode and cathode porosities, during a constant discharge of 100A, and in accordance with an embodiment of the present invention is shown. As stated above changing the porosity of the anode 22 provides a greater change in battery capacity than does changing the porosity of the cathode 20. In fact for the battery tested in this example changing the porosity of the cathode 20 provides a negligible change in the capacity of the battery 18. Curves 110 illustrate changing the porosity of the cathode 20 and maintaining a constant porosity of 0.53 for the anode 22. The capacity of the battery, by changing the porosity of the cathode 20 only, changed by approximately 5 amp hours, at a battery voltage of 6.5. On the other hand, curves 112 illustrate a large change in battery capacity of approximately 47 amp hours, at a battery voltage of 6.5, by changing the porosity of just the anode 22 and keeping the cathode 20 porosity at 0.57. Now referring to FIG. 10, a flow chart illustrating a method of optimizing porosity of battery electrodes 20 and 22, during manufacturing of the battery electrodes 20 and 22 using a first-principles battery model 40 in accordance with an embodiment of the present invention is shown.

In step 150, the optimum battery electrode porosity is determined using the above described methods.

In step 152, a paste mixture is created for the anode 22 and cathode 20 of the battery 18. The paste mixture is a slurry preferably made from litharge or leady oxide (a mixture of lead and lead monoxide), water, and sulfuric acid, plus additives to allow the anode 22 and the cathode 20 to perform well over their service lives. The amount of acid used in the paste has a specific gravity of approximately 1.2 to 1.3, which is about 5M. The density of the electrodes is approximately 3 to 5 g/cm³, with a water content of about 10–15%. The paste for the cathode 20 usually contains lignin, barium sulfate, carbon black, sodium sulfate, or an organic binder. The paste for the anode 22 may include sodium sulfate, graphite, glass fibers tin-oxide doped and not doped, polymer fibers, polypropylene fibers, titanium suboxide, dispersants, or red lead (a higher oxide of lead) to aid formation. The paste mixtures may also contain neutral lead sulfate but is not required since desired porosity may be achieved with sulfuric acid alone. Typical electrode mixture amounts are as follows: 100 kg leady oxide, 5 kg $H_2SO_4$, and 20 kg $H_2O$. The anode 22 may have up to 10 kg of PbSO4. Of course, the paste mixtures may have different electrolyte content. The paste mixture is mixed in a hopper for about 30 minutes, where reactions release heat as know in the art. The above-mentioned materials used in creating the electrodes 20 and 22 are not meant to be limiting. Other materials known in the art may be used.

In step 154, the paste mixtures are applied to areas on the electrodes 20 and 22 that have been divided to form grids. The grids may be of varying size, shape, and correspond to a selected resolution that corresponds to a desired porosity range.

In step 156, the paste mixture on the grids is cured in a drying oven where wedge water is removed to further set the paste and form a plate electrode. The electrodes are further calendared and cured using methods known in the art. The electrodes are then removed from the cure and air-dried.

The above-described invention, by providing a manufacturing method for producing a battery having optimum porosity for a given application also increases battery capacity, performance, and cycle time. Furthermore, providing an efficient method of determining the optimum porosity reduces time and costs involved in developing and manufacturing of the battery.

The above-described manufacturing method, to one skilled in the art, is capable of being adapted for various purposes and is not limited to the following applications: electric vehicles and hybrid electric vehicles, or other vehicle and non-vehicle applications in which electrolyte diffusion efficiency is an important parameter. The above-described invention may also be varied without deviating from the true scope of the invention.

What is claimed is:

1. A method of manufacturing battery electrodes for a battery comprising:
   calculating a desired battery electrode porosity;
   creating a paste mixture in response to said battery electrode porosity;
   applying said paste mixture to a grid to form an electrode; and
   curing said electrode.

2. A method as in claim 1 wherein calculating a desired battery electrode porosity comprises analyzing an application to determine application specific battery performance requirements.

3. A method as in claim 1 wherein calculating a desired battery electrode porosity comprises determining the appropriate elements, compounds, and materials to use for the battery electrodes, which are selected from the following group consisting of: sulfino-lignin, barium sulfate, lead dioxide, plastic fibers, sulfuric acid, lead monoxide, water, carbon black, sodium sulfate, graphite, glass fibers, polymer fibers, titanium sub-oxide, dispersant, and red lead.

4. A method as in claim 1 wherein calculating a desired battery electrode porosity comprises determining a desired electrolyte content.

5. A method as in claim 1 wherein creating a paste mixture further comprises adjusting electrolyte content in said paste mixture.

6. A method as in claim 5 wherein adjusting electrolyte content is performed for one or more battery electrodes.

7. A method as in claim 6 wherein said electrolyte is selected from the following group consisting of: NaSO4, H2SO4, and PbSO4.

8. A method as in claim 1 wherein applying said paste mixture to a grid further comprises applying a paste mixture having different electrolyte content to different areas on said grid.

9. A method as in claim 1 further comprising solving equations that represent electrolyte flow and diffusion and electrode permeability.

10. A method of calculating a desired porosity of battery electrodes of a battery during manufacturing of the battery electrodes using an electrochemical model and a thermal model of a battery comprising:
    determining energy and current requirements of the battery;
    determining battery characteristics in response to said energy and current requirements;
    determining porosity of the battery electrodes by solving equations within the electrochemical model and the thermal model; and
    varying porosity of the battery electrodes until voltage potential across the battery varies by less then a predetermined tolerance factor for an operating range state of charge.

11. A method as in claim 10 wherein preparing said battery characteristics and said energy and current requirements further comprises generating partial differential equations.

12. A method as in claim 10 wherein varying porosity further comprises adjusting the porosity of a battery component selected from the following group comprising: an anode, a cathode, and a separator.

13. A method as in claim 10 wherein calculating a desired porosity of the battery electrodes is performed using an electronic simulation model.

14. A method as in claim 10 wherein calculating a desired porosity of the battery electrodes is performed using a computer.

15. A method as in claim 10 further comprising iteratively adjusting the porosity of the battery electrodes and reevaluating the battery performance.

16. A method as in claim 10 further comprising:
    using a first principles battery model comprising the electrochemical model and the thermal model to determine porosity of the battery electrodes;
    preparing said battery characteristics and said energy and current requirements for use in said first principles battery model to obtain prepared battery characteristics;
    determining porosity of the battery electrodes by solving equations within said first principles battery model using said prepared battery characteristics and said energy and current requirements; and
    varying porosity of the battery electrodes until voltage potential across the battery varies by less then a predetermined tolerance factor for an operating range state of charge.

17. A method of calculating a desired porosity of battery electrodes of a battery during manufacturing of the battery electrodes using a first-principles battery model comprising:
    determining energy and current requirements of the battery;
    determining battery characteristics in response to said energy and current requirements;
    preparing said battery characteristics and said energy and current requirements for use in the first-principles battery model to obtain prepared battery characteristics;
    determining porosity of the battery electrodes by solving equations within the first-principles battery model using said prepared battery characteristics and said energy and current requirements;
    varying porosity of the battery electrodes until voltage potential across the battery varies by less then a predetermined tolerance factor for an operating range state of charge;
    creating a paste mixture in response to said optimum battery electrode porosity;
    applying said paste mixture to a grid to form an electrode; and
    curing said electrode.

18. A method as in claim 17 further comprising iteratively adjusting the porosity of the battery electrodes and reevaluating the battery performance.

19. A method as in claim 17 wherein applying said paste mixture to a grid further comprises applying a paste mixture having different electrolyte content to different areas on said grid.

20. A method as in claim 17 wherein calculating porosity of the battery electrodes is performed using electronic simulation.

21. A method of calculating a desired porosity of battery electrodes of a battery during manufacturing of the battery electrodes using a first-principles battery model comprising:

determining battery capacity, discharge performance, and cycle life;

determining battery characteristics in response to said battery capacity, said discharge performance, and said cycle life;

preparing said battery characteristics, said battery capacity, said discharge performance, and said cycle life values for use in the first-principles battery model to obtain prepared battery characteristics;

determining porosity of the battery electrodes by solving equations within the first-principles battery model that represent electrolyte displacement, electrolyte flow, electrolyte permeability, electrolyte diffusion, and electrolyte saturation using said prepared battery characteristics, said battery capacity, said discharge performance, and said cycle life values;

varying porosity of the battery electrodes until voltage potential across the battery varies by less then a predetermined tolerance factor for an operating range state of charge;

creating a paste mixture in response to said optimum battery electrode porosity;

applying said paste mixture to a grid to form an electrode; and curing said electrode.

* * * * *